United States Patent [19]
Ball

[11] Patent Number: 4,629,964
[45] Date of Patent: Dec. 16, 1986

[54] BATTERY POWER SOURCE

[76] Inventor: Newton E. Ball, 5229 Rimpark La., San Diego, Calif. 92124

[21] Appl. No.: 536,752

[22] Filed: Sep. 28, 1983

[51] Int. Cl.⁴ .............................. H02J 7/04; H02J 9/00
[52] U.S. Cl. ......................................... 320/14; 320/32; 320/39; 320/59; 320/DIG. 2; 307/66; 323/235
[58] Field of Search .................. 320/2, 13, 14, 32, 39, 320/40, 44, DIG. 2, 57, 59; 307/66; 323/235

[56] References Cited

U.S. PATENT DOCUMENTS

| | | | |
|---|---|---|---|
| 3,950,689 | 4/1976 | Jamison | 320/14 X |
| 4,194,146 | 3/1980 | Patry et al. | 320/44 |
| 4,220,872 | 9/1980 | Fahey | 307/66 X |
| 4,307,330 | 12/1981 | Belot | 320/44 |
| 4,323,788 | 4/1982 | Smith | 307/66 |
| 4,366,390 | 12/1982 | Rathmann | 307/66 |
| 4,400,661 | 8/1983 | Duley | 307/66 X |
| 4,488,057 | 12/1984 | Clarke | 307/66 |

OTHER PUBLICATIONS

"SCR Zero-Cross Trigger Limits Maximum Load Power", Eckhardt, *Designer's Casebook*, Pub., McGraw-Hill, Aug., 1979, p. 51.

*Primary Examiner*—R. J. Hickey
*Attorney, Agent, or Firm*—Charmasson & Holz

[57] ABSTRACT

A regulated, low-voltage DC power source which draws energy from a standard AC outlet and uses a bank of lead-acid batteries for intermediate power storage.

The power source features a multi-level charge-voltage controller which is automatically adjusted in function of the net current flowing in or out of the batteries. The charge-voltage control is accomplished by switching the charging current rectifiers on or off only at the zero-axis crossing in order to minimize voltage spikes, and only at every other crossing in order to minimize DC components in the secondary of the transformer. Charge current, load current and net battery current are separately metered in order to provide maximum efficiency and safety in the operation of the power source. A low-voltage-drop series regulator is relied upon to provide a 5 volt regulated output to the load from a 6 volt unregulated battery voltage source.

15 Claims, 3 Drawing Figures

BATTERY POWER SOURCE

FIELD OF THE INVENTION

This invention relates to regulated DC power sources for elecronic circuits. More specifically this invention relates to power sources for data processing equipment and more particularly CMOS-type digital circuits.

BACKGROUND OF THE INVENTION

Contemporary data processing apparatuses with their ever-increasing use of large-scale integrated circuits and fast throughput, require highly regulated power sources with quick recovery from overload conditions and total immunity from spurious high-frequency transients due to line variations and switching noise.

These power sources must also be protected from line power failures.

The prior art has primarily relied on highly sophisticated but complex regulating and filtering techniques in order to provide a noise-free supply voltage source.

In case of line power failure the system would be automatically switched to an auxiliary generator; but not without creating large amounts of output voltage variation and transients.

Prior attempts to use batteries as intermediary storage between the energy source and the output load have failed to properly regulate the charging current and voltage applied to the batteries, thus causing various overloading conditions which tend to shorten the life of the batteries.

SUMMARY OF THE INVENTION

The primary object of this invention is to provide a highly regulated, noise-free power source for digital integrated circuits.

Another object of this invention is to provide a power source which is totally immune to short losses of line power.

A further object of this invention is to provide a system for controlling the charge and discharge cycles of batteries used as power source for electronic circuits.

It is also an object of this invention to provide a battery-charging and switching circuit which minimizes DC components in the secondary of the line transformer.

These and other useful objects are achieved by using a bank of batteries as intermediary power storage, regulator and filter; controlling the charge of the batteries in function of the net current flowing through the batteries, in order to avoid any current overload; and by using a line-synchronous switching scheme that changes state only at the zero-axis crossing of full line cycles.

DESCRIPTION OF THE PREFERRED EMBODIMENT OF THE INVENTION

Figure 1:
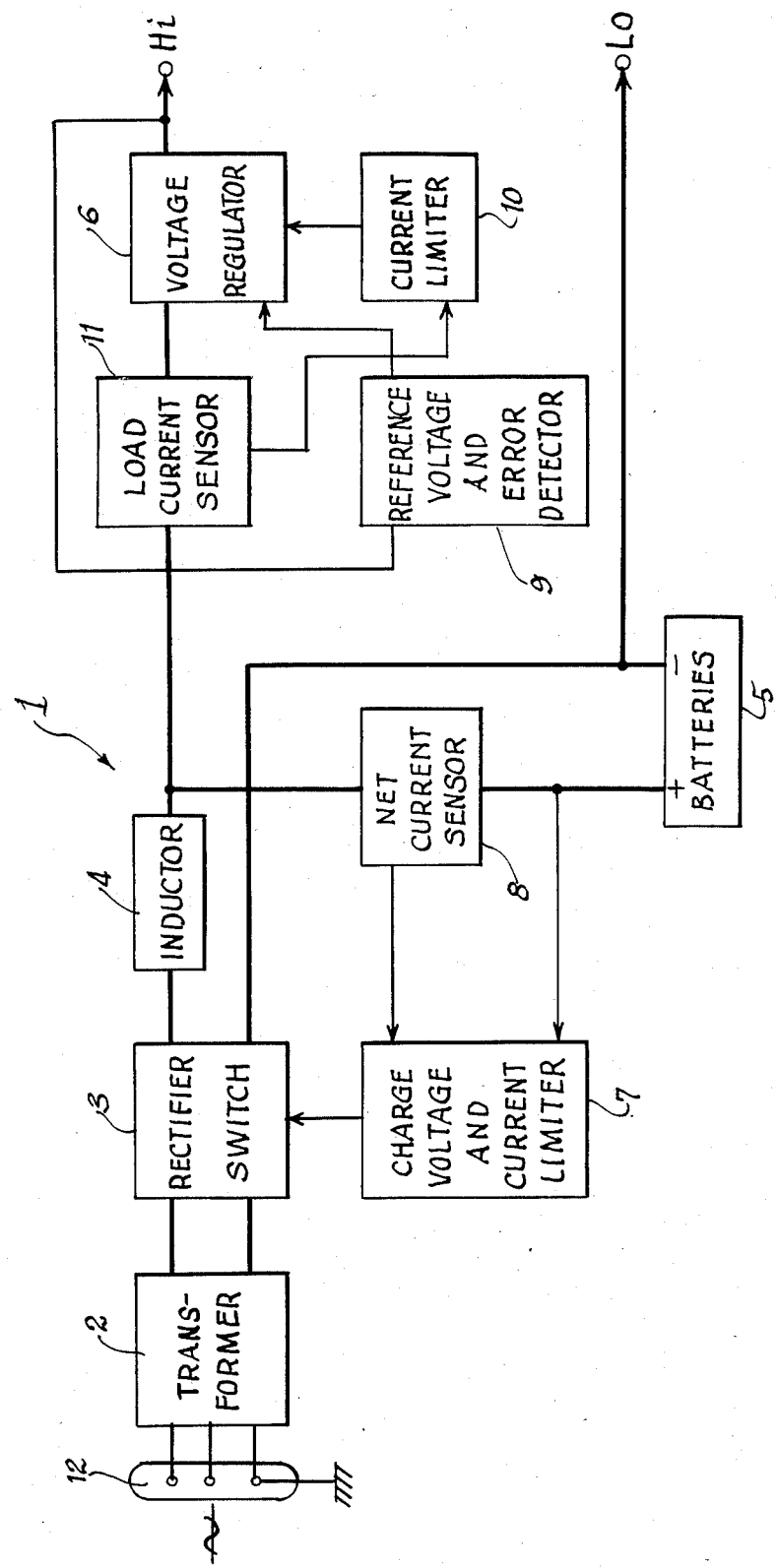
FIG. 1 is a general block diagram of the power sources.

Referring now to the drawing and beginning with FIG. 1, there is shown a general block diagram of the power source 1. The batteries 5 are preferably made of three series-connected lead-acid elements to provide a nonimally 6 volt output voltage. A bank of several 6 volt batteries maybe used depending upon the output current capacity desired. The batteries 5 are charged from the AC line power which is fed to a transformer 2 through connector 12. The output of the transformer is rectified through a set of switchable rectifiers 3 whose outputs are filtered by a single inductor 4. A current sensor 8 is used to meter the net amount of current which flows in and out of the batteries 5. A charge and voltage current limiter 7 controls the switchable rectifiers 3 in function of the output of the net current sensor 8. The charge voltage applied to the batteries 5 is set at 7.3 volt under high net current conditions, and drops to 6.9 volt when the net current decreases below a preset level. The maximum sum of the charging and load currents is also regulated by controlling the rectifiers 3.

The output voltage from the battery is regulated through a voltage regulator 6 in function of the output of a reference voltage and error detector 9. A load current sensor 11 monitor the amount of output load current and control a current limiter 10 which works in conjunction with the voltage regulator 6.

Figure 2:
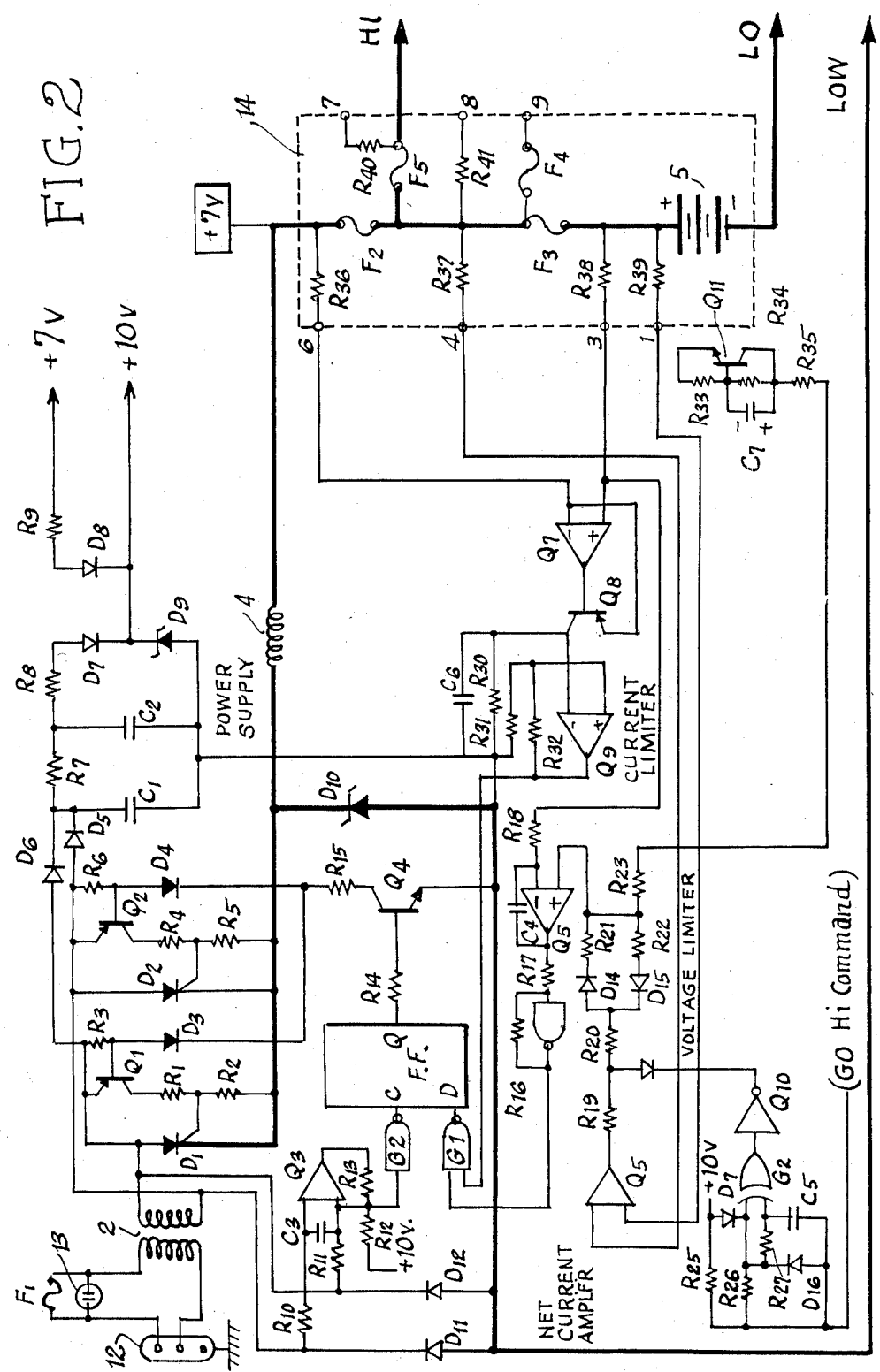
FIG. 2 is an electrical schematic of the charger circuit.

A more complete understanding of the voltage battery charging circuit may be gathered from the electrical schematic given in FIG. 2. The AC power is run from connector 12 through the fuse and light indicator 13 and applied to the primary or transformer 2. The secondary of the transformer is applied to the anodes of two switchable rectifiers D1 and D2. The cathodes of the rectifiers are joined together and applied to one terminal of the inductor 4 and to the positive terminal of a snubber zener diode D10. The rectifiers gates are controlled through Q1, Q2 and Q4 by the output of a toggle FF, the toggle FF is clocked by the output of a differential amplifier Q3. This amplifier which monitors the output of the transformer 2 is designed to detect the time at which the line voltages crosses the zero-axis at the beginning of each full cycle. The toggle FF is enabled through gate G1 under two sets of conditions: First when the current limiter constituted by Q7, Q8 and Q9 detects an excess of current flowing into the battery and to the load. Second, when the voltage limiter constituted by Q6 and G3 recognizes a battery voltage equal to a predetermined limit. The total maximum current is detected by monitoring the voltage drop across fuses F2 and F3 on the positive terminal of the batteries 5. The net current is monitored by measuring the voltage drop across fuse F3 by means of the net current amplifier Q5. The net current could also be measured by subtracting an analog measurement of the load current from an analog measurement of the charging current, or by any other method known to those skilled in the art. A charge voltage reference of 7.1 volt is generated by Q11 which is mounted near the batteries 5 in order to provide a temperature compensation through its base-emitter junction. This reference voltage is either raised to 7.3 volt through diode D14 when the net-current flow is high; and is dropped to 6.9 volt through diode D15 when the net-current flow is low. The circuit associated with G2 and Q10 provides a remote means for forcing the voltage limiter to assume a high voltage condition as if the net current flow was high. The batteries are packaged in a compact enclosure 14, a section of which is also illustrated in FIG. 3.

Figure 3:
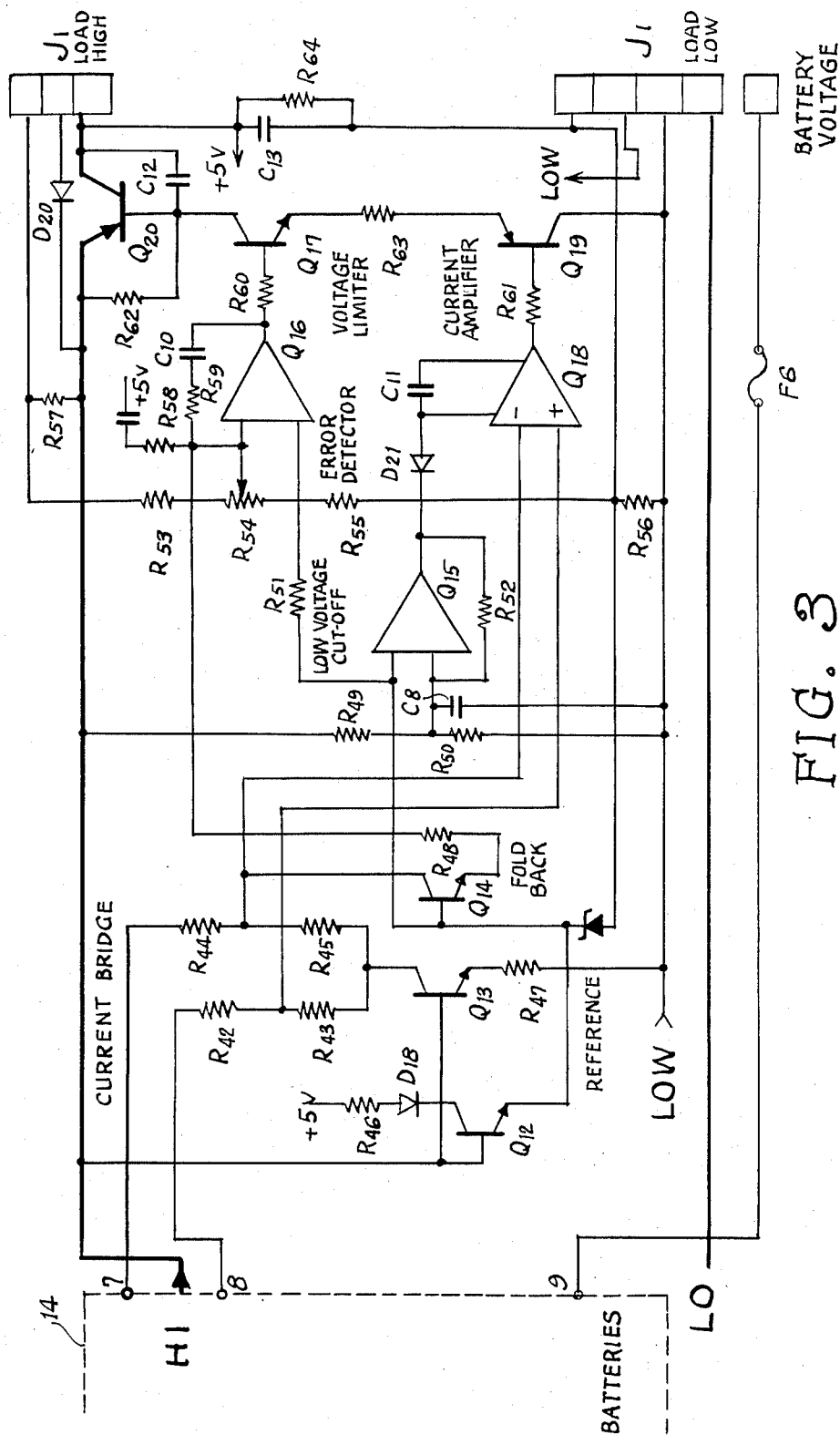
FIG. 3 is an electrical schematic of the voltage regulator.

The electrical schematic of FIG. 3 illustrates the voltage regulating and current limiting circuits between the batteries assembly 14 and the output connector J1.

The positive terminal HI is run through a pass transistor Q20 which is used to regulate the output voltage to a nominal 5 volt.

Q12 and zener diode D19 provide a reference voltage which is applied to the error voltage detector Q16. Q16 in turn drives Q17 which with Q19 controls the current flowing into the base of Q20. Q19 which normally is saturated low is used to reduce the output load voltage when excessive current is detected flowing toward the load. Excessive load current is detected by a bridge comprised of resistors R42, R43, R44, R45 and fuse F5 monitored between terminals 7 and 8 of the battery assembly 14. A low voltage high current condition (indicating a load short) is sensed by means of fold back transistor Q14 and the low current cutoff amplifier Q15. Amplifier Q18 turns off Q19 whenever one of the two excessive current conditions is detected.

The net current limits which determine the level of the charging voltage are set according to the capacity of the battery bank. A high charging voltage of 7.3 volt will be maintained until the net current drops below a value corresponding to the capacity of the battery bank divided by 100 hours nominal. The low charging voltage or "float" rate of 6.9 volt will be maintained until the net current rises above a value corresponding to the capacity of the battery bank divided by 50 hours nominal. In each case, the capacity is given in ampere/hours.

The maximum net current limit which is monitored by the charging circuit corresponds to the capacity of the battery bank divided by 4 hours.

While the preferred embodiment of the invention has been described, other embodiments may be devised and modifications can be made without departing from the spirit of the invention and the scope of the appended claims.

What is claimed is:

1. A low voltage DC power-supply for an electronic circuit load which comprises:
    at least one battery;
    means for regulating the voltage delivered from said battery to said load; and
    means for charging said battery from AC line power source comprising:
        means for controlling the charging voltage applied to said battery in function of the net current flowing in and out of said battery;
        switchable means for rectifying the AC line power;
        means for detecting the full-cycle zero-axis crossing time of the AC line power; and means for switching said means for rectifying at said zero-axis crossing time.
2. The power supply claimed in claim 2 wherein said means for controlling comprises:
    means for metering the net current flowing in and out of said battery; and
    means, responsive to said means for metering, for setting said charging voltage.
3. The power supply claimed in claim 2 wherein said means for setting comprises:
    means for inhibiting said means for switching.
4. The power supply claimed in claim 3 wherein said means for switching comprises;
    toggling means triggered at said zero-axis crossing time; and
    gating means for inhibiting said toggling means in repsonse to said means for metering.
5. The power supply claimed in claim 4 wherein said means for setting comprises:
    a charging voltage reference having compensating means responsive to the temperature about said battery; and
    means for generating a plurality of discrete charging voltage reference levels in response to the output of said means for metering.
6. The power supply claimed in claim 2 wherein said means for controlling comprises:
    means for measuring the total amount of current delivered by said means for charging; and means, responsive to said means for measuring, for limiting said charging voltage.
7. The power supply claimed in claim 5 wherein said means for limiting comprises means for inhibiting said means for switching.
8. The power supply claimed in claim 2 wherein said means for regulating comprises:
    means for monitoring the battery output load current; and
    means, responsive to said means for monitoring, for limiting the output load voltage.
9. The power supply claimed in claim 8 wherein said means for monitoring comprises:
    a current sensing bridge having one element in series with said load.
10. The power supply claimed in claim 9 wherein said means for regulating comprises:
    an outpout voltage reference source;
    an error voltage detector; and
    means for adjusting the output load voltage in function of the output level of said error voltage detector.
11. The power supply claimed in claim 8 wherein said means for regulating comprises:
    means for detecting a low output load voltage condition; and
    means, responsive to said means for detecting, for switching off said output voltage.
12. The power supply claimed in claim 2 wherein said battery comprises a bank of three series-connected elements, lead-acid batteries totalling 6 volts.
13. The power supply claimed in claim 12 wherein said charge voltage is set at 7.3 VDC under high net current condition, and at 6.9 VDC under low net current condition; and wherein the output load voltage is 5 volts.
14. The power supply claimed in claim 2 wherein said means for metering the net current comprise means for measuring the voltage drop across a fuse mounted in series with one of the battery terminals.
15. The power supply in claim 1, wherein the means for charging floats said battery at a float voltage; and
    said means for controlling includes means for lowering the float voltage when the net charging current flowing in and out of said battery reaches a threshold level.

* * * * *